Patented Sept. 12, 1922.

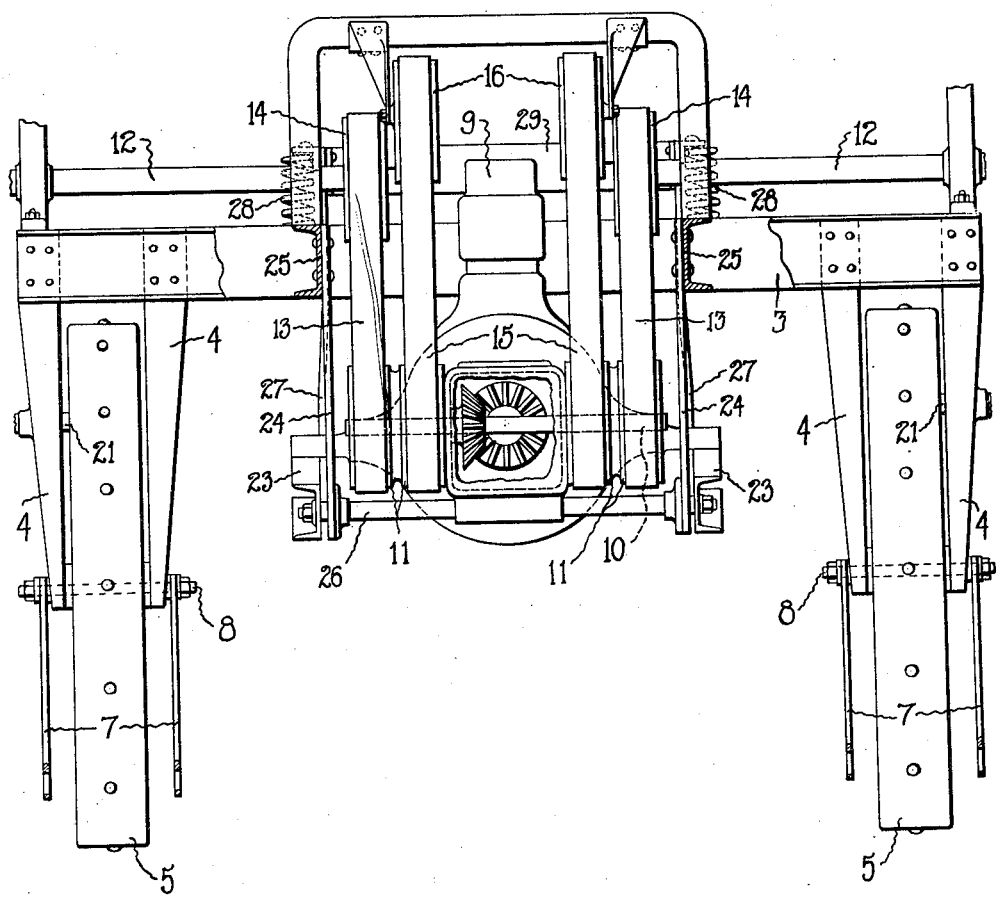

1,428,854

UNITED STATES PATENT OFFICE.

JOHN M. MEYERS, OF JANESVILLE, WISCONSIN, ASSIGNOR TO GENERAL MOTORS CORPORATION, OF DETROIT, MICHIGAN, A CORPORATION OF DELAWARE.

FARM TRACTOR.

Application filed December 17, 1919. Serial No. 345,634.

*To all whom it may concern:*

Be it known that I, JOHN M. MEYERS, a citizen of the United States, and a resident of Janesville, county of Rock, and State of Wisconsin, have invented certain new and useful Improvements in Farm Tractors, of which the following is a full, clear, concise, and exact description, such as will enable others skilled in the art to which the invention relates to make and use the same, reference being made therein to the accompanying drawings, which form a part of this specification.

My invention relates to farm tractors designed particularly for agricultural purposes, for hauling implements employed in the cultivation of the ground, although the same may be used generally and for other tractive purposes; and the object of my invention is to provide improved means for supporting the engine or motor whereby the tractor is driven, the purpose of said supporting means being to relieve the engine or motor and the parts associated therewith from strains due to unevenness of the ground over which the tractor is being driven, to distortion of the main frame of the tractor due to such unevenness, or from strains due to other causes or circumstances.

A further object of my invention is to provide an improved tractor of the type above referred to and wherein the engine or motor whereby the vehicle is propelled is supported by a supplemental frame, which in turn is yieldably supported from the main frame of the vehicle; so that the said main frame may partake of a certain amount of movement independently of the supplemental frame, and so that strains due to such movement will not be transmitted to the supplemental frame because of the yieldable method of support provided for the supplemental or auxiliary frame.

A further object of my invention is to provide an improved farm tractor in which the engine which drives the same is supported beneath the main frame thereof and upon a supplemental frame located beneath said main frame, and centrally relative to said main frame; so that the center of gravity of the tractor will be lowered while at the same time the main frame will be located high enough to clear growing crops when the tractor is employed for cultivating purposes.

A further object of my invention is to provide improved means whereby the implements or devices to be drawn by the tractor may be more conveniently connected therewith than has heretofore commonly been the case.

My improved farm tractor is illustrated in its preferred form in the drawings accompanying and forming a part of this specification; although it will be appreciated that the same may be variously modified, and that my invention is in no sense limited to the particular embodiment thereof illustrated in the drawings so long as such assumed modified forms come within the scope of the concluding claims wherein the distinguishing features in which my invention consists are particularly pointed out.

In the accompanying drawings:

Figure 2 is a view showing my invention in end elevation, and as seen from a position to the right of Figure 1.

Figure 1:
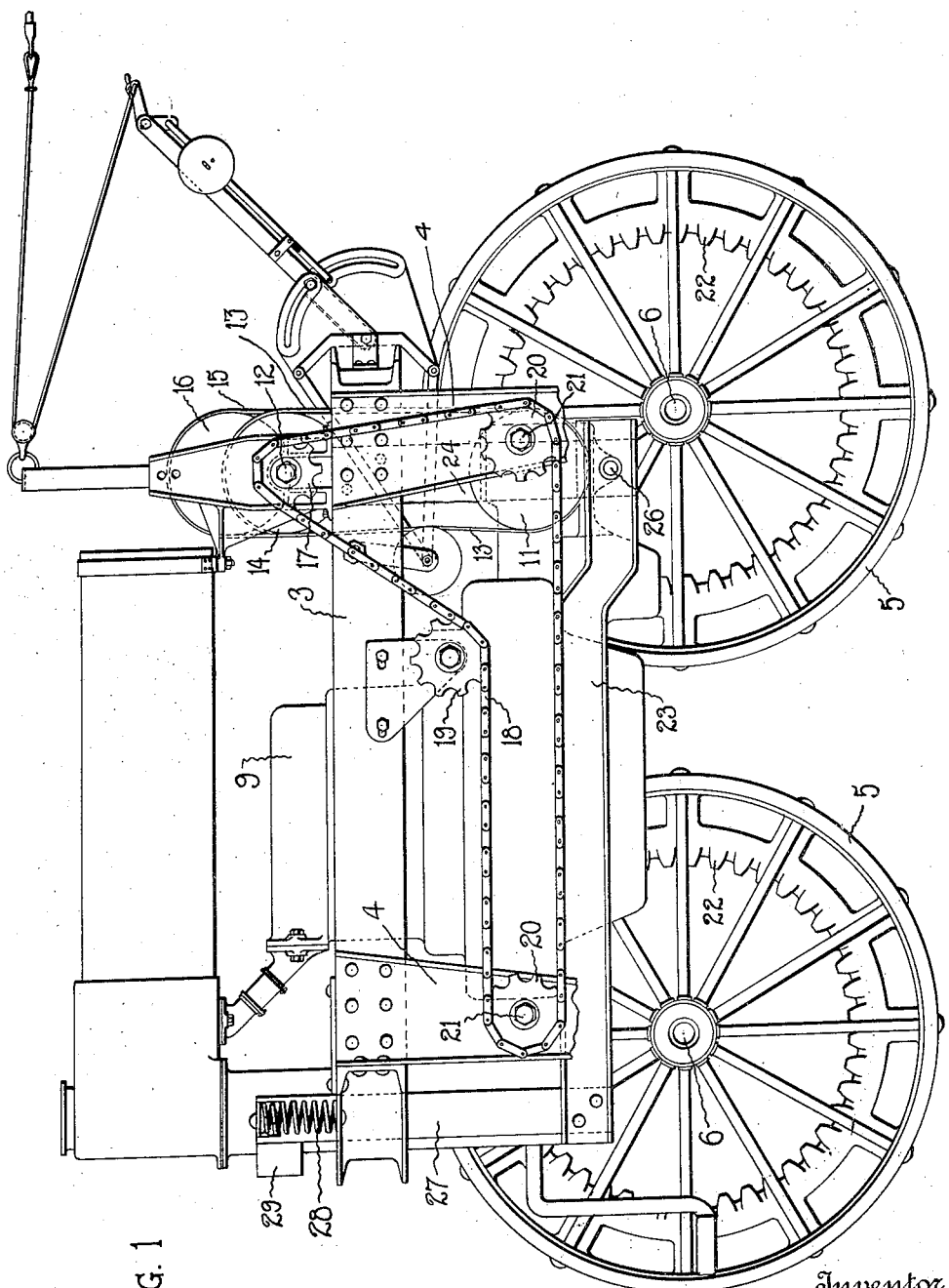
Figure 1 is a view showing my improved farm tractor in side elevation.

Referring to the drawings, the reference numeral 3 designates the main frame of my improved tractor from which all the parts thereof are supported and held in proper positions relative to one another, and which frame may be of any suitable form so long as it performs the function for which it is provided and serves as a support for the various operating parts of the machine.

The main frame 3 is provided with a plurality of pairs of depending legs 4, 4, located at the sides of the tractor, four such pairs of legs being present in the form of my invention herein disclosed; as the embodiment of my invention illustrated is provided with four driving wheels all designated by the reference numeral 5 and which are located one at each corner of the frame. The main frame and the depending legs 4 are rigidly connected with one another to thereby provide a unitary or single piece frame in the form of my invention shown, and the driving wheels 5 are located one between the lower ends of each pair of legs, as best shown in Figure 2.

The driving wheels 5 are themselves supported by hollow shafts 6, the ends of which are supported at the lower ends of the legs in order to thereby provide for the hitching of implements to be drawn by the tractor to the same through and by means of suitable pairs of links or equivalent traction members or draw bars 7 connected with the implement or implements to be drawn, and the free ends of which are provided with holes; so that bolts 8 may be passed through said holes and through the passage in the shaft 6 to thereby fasten the links to the tractor, all of which will be understood from Figure 2 of the drawing in which two links are shown as connected with two of the driving wheels one located upon each side of the tractor.

The reference numeral 9 designates in a conventional manner any suitable kind of engine or driving motor and which engine serves to drive a transversely extending shaft 10 having pairs of driving pulleys 11, 11 secured one pair at each end thereof, as best shown in Figure 2, and which pairs of pulleys drive two driving shafts 12, 12 located one upon each side of the center of the tractor in a forward direction through belts 13, 13 and pulleys 14, 14 secured to said driving shafts. Said shafts 12, 12 are driven in a reverse direction through belts 15, 15 and pulleys 16, 16 which are connected with the said driving shafts through suitable gearing located within the pulleys 14, 14. This driving mechanism, however, is not illustrated in detail in this present case as the same forms no part of the invention to which this application relates, and, so far as concerns this present application, the driving mechanism may be of any form so long as it serves to communicate motion from the engine 9 to the driving wheels 5 upon opposite sides of the tractor.

In the embodiment of my invention illustrated the driving shafts 12, 12 are provided each with a pinion one of which is shown at 17 in Figure 1, and which pinions are in driving engagement with sprocket chains 18 which extend about idler sprockets one of which is shown at 19, and about two other sprockets 20, 20 secured to the outer ends of short shafts 21, the inner ends of which are provided with pinions which engage internal annular racks 22 carried by the driving wheels 5 to thereby communicate motion to the wheels when the engine is in operation, the construction here described being duplicated upon the side of the tractor not shown in Figure 1 of the drawings as will be understood.

The engine 9 or equivalent operating motor is itself supported by a supplemental frame comprising two oppositely disposed side members 23, 23 the right-hand ends of which, referring to Figure 1, are pivotally supported from the main frame 3 by depending supports 24, 24, the upper ends of which are secured to longitudinally extending channel bars or equivalent members 25, 25 spaced inward from the sides of the frame; and the lower ends of which supporting elements are provided with holes through which and through holes in the side members 23 a tie-bolt or rod 26 extends, thereby providing a pivotal support for the right-hand ends of the side members 23 and of the supplemental frame which serves as a direct support for the engine. The left-hand ends of these side members 23 are connected with the lower free ends of two oppositely disposed supporting members 27, 27, the upper ends of which extend above the main frame 3 and which upper ends are supported from said frame through two oppositely disposed springs 28, 28, the lower ends of which bear upon and are supported by said main frame in the arrangement of the parts illustrated in the drawings; said upper ends being preferably connected one with another through a transversely extending tie-bar 29 to thereby maintain said members properly spaced apart from one another.

In view of the premises it will be appreciated that the auxiliary or supplemental frame whereby the engine is supported from the main frame is itself supported in a position beneath the main frame of the machine, thereby providing a tractor in which the center of gravity is low while at the same time the main frame is upon a level sufficiently high to clear growing crops when the tractor is used for cultivating.

In addition, the said supplemental frame is pivotally supported at one of its ends from the main frame through the supports 24 and the rod 26, and is yieldably supported from the main frame at its other end through and by means of the springs 28 and the supporting members 27 extending upwardly from said auxiliary frame; from which it follows that the engine is relieved from strains due to such distortion of the main frame as may occur when the tractor is in use, and is protected also from shocks due to the movement of the tractor over the surface of the ground there being, it will be observed, no spring support for the frame of the tractor nor for the elements thereof other than for the supplemental frame which supports the driving engine of the tractor.

Having thus described and explained my invention, I claim and desire to secure by Letters Patent:

1. In a tractor, a suitable main frame; driving wheels whereby said main frame is supported; two oppositely disposed supporting members depending from said main frame; a supplemental frame one end of which is pivotally supported from said main frame through said supporting members; two oppositely disposed supporting members connected with the other end of said supplemental frame and extending upwardly therefrom and terminating above said main frame; two springs associated one with each of said last mentioned supporting members and the lower ends of which are supported by said main frame, and through which springs said supplemental frame is supported from said main frame; an engine carried by said supplemental frame; and power transmitting mechanism through which said driving wheels are driven from said engine.

2. In a tractor, a unitary rigid main frame; four pairs of legs depending from said frame and the upper ends of which are rigidly connected therewith; four driving wheels rotatably supported one between each of said pairs of legs and at the lower ends thereof; a supplemental frame pivotally supported at one end from said main frame and located beneath the same; spring mechanism whereby and through which the other end of said supplemental frame is yieldably supported from said main frame; a motor carried by said supplemental frame; and transmitting mechanism through which said driving wheels are driven from said motor, the arrangement of said transmitting mechanism being such that the driving wheels upon each side of the tractor may be driven independently of those on the other side.

3. In a tractor, a suitable main frame; four pairs of legs depending from said main frame; four driving wheels rotatably supported one between each of said pairs of legs; a supplemental frame located beneath said main frame; springs whereby said supplemental frame is supported from said main frame; a motor carried by said supplemental frame; and power transmitting mechanism through which said driving wheels are driven from said motor.

4. In a tractor, a unitary rigid main frame having four pairs of legs depending therefrom; four driving wheels rotatably supported one between each of said pairs of legs; a supplemental frame located beneath said main frame and one end of which is pivotally supported from said main frame; spring mechanism whereby the other end of said supplemental frame is supported from said main frame; a motor carried by said supplemental frame; and power transmitting mechanism through which said driving wheels are driven from said motor.

5. In a tractor, a suitable frame having a pair of depending legs; a hollow shaft the ends of which are supported by said legs and which shaft serves as a support for a driving wheel; a draft member extending into said hollow shaft; a motor carried by said frame; and power transmitting mechanism through which said driving wheel is driven from said motor.

6. In a tractor, a suitable frame having four pairs of depending legs disposed two pair upon each side thereof; four driving wheels arranged one between each of said pairs of legs; four hollow shafts the ends of which are supported in bearings located at the lower ends of said legs, and which shafts serve as supports for said driving wheels; draft members extending into two of said hollow shafts; an engine supported from said frame; and power transmitting mechanism through which said driving wheels are driven from said engine.

7. In a tractor, a frame, a propelling wheel having a hollow shaft, and a draft member passing through said shaft for utilizing the tractor for pulling purposes.

8. In a tractor, a wheel, a hollow shaft on which said wheel turns, and a draft member extending into the opening in said shaft for transmitting pulling force from said tractor to an object or apparatus to be pulled.

9. In a tractor, a frame including a shaft open at the ends, a supporting wheel journaled on said shaft, and pulling members projecting into the ends of said shaft.

10. In a tractor, a propelling wheel, a shaft whereon said wheel turns, a frame including portions on opposite sides of the wheel in which the corresponding ends of the shaft are received, draw bar means associated with the shaft on opposite ends thereof serving to transmit pulling force from said wheel to an object or apparatus to be pulled without passing said force through the frame.

11. In a tractor, two driving wheels located on opposite sides thereof, a cross-frame connecting said wheels and forming in its lower side unobstructed channels extending longitudinally of the tractor and the upper ends of which channels extend above the level of the centers of the wheels, a propelling engine yieldably slung from the central portion of said frame between the channels aforesaid with its shaft below the tops of said wheels, and means for driving the wheels from said engine shaft.

12. In a tractor, two driving wheels located on opposite sides thereof, a main frame extending across the tractor from side to side substantially at or above the tops of said wheels and including depending posts supported by said wheels, a sub-frame slung from said main frame between and spaced apart from the wheels upon each side of the tractor, and having limited cushioned up-and-down movement in respect to said frame, an engine supported by said sub-frame, and means for driving said wheels from the engine.

13. In a tractor, pairs of driving wheels two located on each side thereof, a main frame supported on said wheels, a sub-frame slung from said frame and arranged longitudinally thereof and having limited pivotal movement in respect to said frame, an engine rigid with said sub-frame with its crank shaft extending longitudinally of the tractor, and means for driving said wheels from the engine, said means extending upwardly from the engine to said main frame and then outwardly along said frame to the corresponding side of the tractor.

14. In a tractor, a unitary rigid main frame, driving wheels arranged in pairs and non-yieldably carrying said frame and which driving wheels are held in permanently fixed positions relative to said frame, a supplemental frame pivotally supported near one end from said main frame and located beneath the same along the longitudinal central plane thereof, spring means whereby the other end portion of the supplemental frame is supported from the main frame, an engine carried by the supplemental frame, and means for driving the wheels from the engine.

In testimony whereof I affix my signature.

JOHN M. MEYERS.